(12) United States Patent
Roebroeks

(10) Patent No.: US 7,527,846 B2
(45) Date of Patent: May 5, 2009

(54) JOINT CONSTRUCTION IN A LAMINATE OF METAL AND PLASTIC LAYER

(75) Inventor: Gerardus Hubertus Joannes Jozeph Roebroeks, Den Bommel (NL)

(73) Assignee: Fokker Aerostructures B.V., Papendrecht (NL)

( * ) Notice: Subject to any disclaimer, the term of this patent is extended or adjusted under 35 U.S.C. 154(b) by 283 days.

(21) Appl. No.: 11/655,879

(22) Filed: Jan. 22, 2007

(65) Prior Publication Data

US 2007/0116906 A1 May 24, 2007

Related U.S. Application Data

(63) Continuation of application No. 10/275,890, filed as application No. PCT/NL01/00353 on May 9, 2001, now abandoned.

(30) Foreign Application Priority Data

May 9, 2000 (NL) .................................. 1015141

(51) Int. Cl.
*B32B 3/00* (2006.01)

(52) U.S. Cl. .............. 428/57; 428/54; 428/56; 428/58; 428/60; 428/61; 428/403

(58) Field of Classification Search .............. 428/57, 428/54, 56, 58, 60, 61, 403
See application file for complete search history.

(56) References Cited

U.S. PATENT DOCUMENTS 5,160,771 A 11/1992 Lambing et al.

FOREIGN PATENT DOCUMENTS

WO WO 98/53989 12/1998

*Primary Examiner*—Jane Rhee
(74) *Attorney, Agent, or Firm*—Young & Thompson

(57) ABSTRACT

A joint construction in a laminate of, alternately, at least two metal layers and at least one plastic layer accommodated between them comprises metal layers which each have at least two sections. The two sections of at least one outer metal layer overlap one another and are fixed to one another at the location of the overlap by means of an adhesive. Each metal layer has overlapping sections which are fixed to one another by an adhesive.

16 Claims, 1 Drawing Sheet

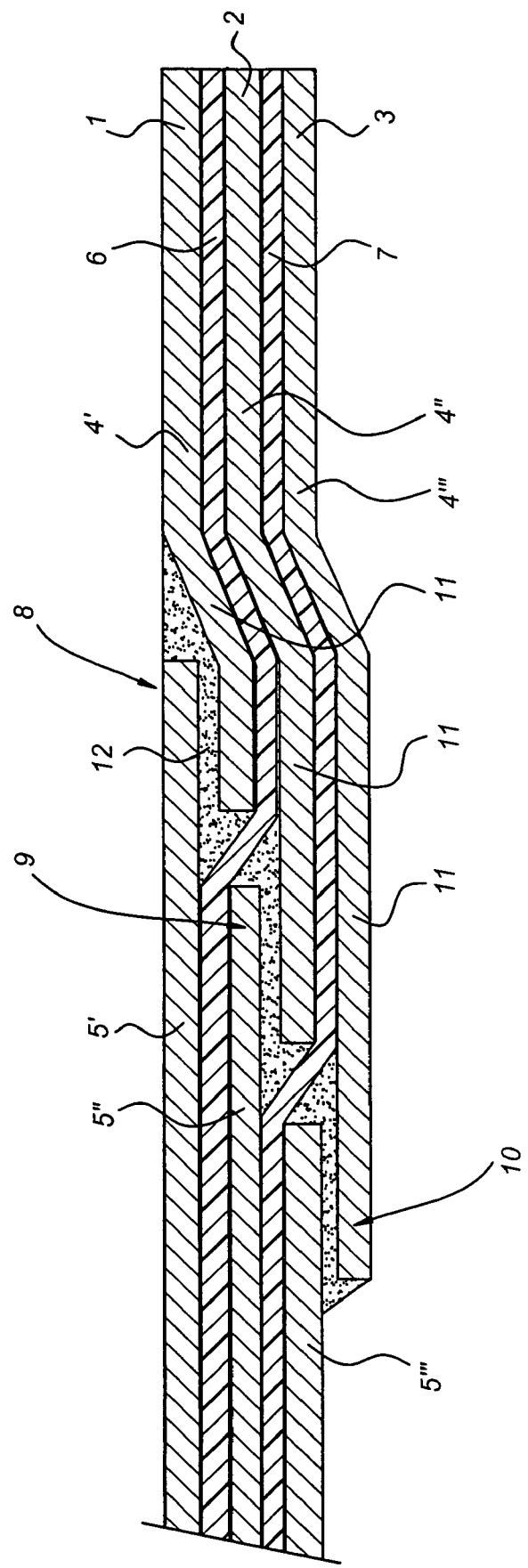

JOINT CONSTRUCTION IN A LAMINATE OF METAL AND PLASTIC LAYER

This application is a continuation of co-pending application Ser. No. 10/275,890, filed on Jun. 6, 2003. Application Ser. No. 10/275,890 is the national phase of PCT International Application No. PCT/NL01/00353 filed on May 9, 2001 under 35 U.S.C. § 371, which claims priority of Dutch Application No. 1015141 filed May 9, 2000. The entire contents of each of the above-identified applications are hereby incorporated by reference.

The invention relates to a joint construction in a laminate of, alternately, at least two metal layers and at least one plastic layer incorporated between them, which metal layers each comprise at least two sections and the two sections of at least one outer metal layer overlap one another, which two sections are fixed to one another at the location of the overlap by means of an adhesive.

A joint construction of this type is disclosed in EP-A 983 141. This known joint construction has three metal layers, between which two plastic layers are accommodated. One of the outer metal layers has two sections which overlap one another in such a way that a smooth surface is obtained. The spaces next to the overlap are filled with the glue by means of which the overlapping parts of the sections are fixed to one another.

The other metal layers and the plastic layers continue on at the location of the overlap. These other metal layers also consist of two sections, the leading edges of which abut one another. The outer layer thereof is provided with a glued fixing strip at the location of the leading edges, which fixing strip, together with the plastic layer located on the other side of the sections, must provide for the transfer of force between said sections.

This known joint construction has a number of disadvantages. First of all the seam between the sections with leading edges abutting one another must have fairly accurately prescribed dimensions. This means that the sections themselves must have fairly accurate dimensions and also that the sections must be positioned accurately with respect to one another. A further disadvantage is that an additional joining strip has to be applied to one of the free sides of the joint construction. For these reasons a joint construction of this type is relatively inconvenient and expensive.

The aim of the invention is to provide a joint construction of the type described above that can be produced more simply. Said aim is achieved in that each metal layer has overlapping sections which are fixed to one another by means of an adhesive.

In the case of the joint construction according to the invention all sections can be produced and positioned with respect to one another with wide tolerance. The cost can consequently remain relatively low, without, however, this leading to inaccuracies or insufficient strength.

In this context the joint construction can be so constructed that the overlap between two sections of a metal layer is offset with respect to the overlap between two sections of another metal layer.

The outside of the joint construction is continuous and smooth if, in each metal layer, one section is straight and the other section is joggled. Such an embodiment is important when the joint construction is used in panels for aircraft and the like.

The invention will be explained in more detail below with reference to an illustrative embodiment shown in the figure.

The figure shows a cross-section through a joint construction according to the invention. This joint construction comprises three metal layers 1-3, each of which consists of two sections 4', 5'; 4", 5"; 4''', 5'''. Two layers of plastic material 6, 7, which, for example, consist of a matrix of glass fibres embedded in a resin, are arranged between the metal layers 1-3

The sections 4'-5''' of each of the layers 1-3 overlap one another at the location of an overlap 8 to 10. For this purpose the one section 4' of the outer metal layer 1 has a section 11 that is joggled on and extends to below the other section 5'. The sections 4' and 5' are glued to one another at the location of the overlap 8 by means of a layer 12 of glue.

For the sections 4", 4''' of the other layers 2, 3 it is also the case that the section 11 thereof is joggled and extends below the other section 5", 5''' of said metal layer 2 or 3, respectively.

The plastic layers 6, 7 run through continuously at the location of the overlap 8-10.

The invention claimed is:

1. A joint structure in a laminate comprising:
   a first, outermost metal layer comprising first and second separate sections having outer surfaces arranged to be generally continuous with one another, the first section having an edge portion bent out of alignment with both the second section and a remainder of the first section, the edge portion of the first section overlapping and being glued to an inner surface of the second section at the joint structure;
   a first layer of plastic material in direct contact with inner surfaces of the first and second sections of the outermost metal layer; and
   a second metal layer comprising third and fourth separate sections, the third section having an edge portion bent out of alignment with both the fourth section and a remainder of the third section, the edge portion of the third section overlapping and being glued to an inner surface of the fourth section at the joint structure, the second metal layer being in direct contact with the first plastic layer.

2. The joint structure of claim 1, further comprising:
   a second layer of plastic material in direct contact with inner surfaces of the third and fourth sections of the second metal layer; and
   a third metal layer comprising fifth and sixth separate sections, the fifth section having an edge portion bent out of alignment with a remainder of the fifth section and the sixth section, the edge portion of the fifth section overlapping and being glued to an inner surface of the sixth section at the joint structure, the third metal layer being in direct contact with the second plastic layer.

3. The joint structure of claim 1, wherein the first layer of plastic material is uninterrupted at the joint structure.

4. The joint structure of claim 3, wherein the plastic material is a matrix of glass fibres embedded in a resin.

5. The joint structure of claim 3, wherein the overlapping edge portion of the first metal layer is staggered with respect to the overlapping edge portion of the second metal layer, so that no said overlapping edge portion lies directly above any other said overlapping edge portion within the joint structure.

6. The joint structure of claim 5, wherein the plastic material is a matrix of glass fibres embedded in a resin.

7. The joint structure of claim 2, wherein the first and second layers of plastic material are uninterrupted at the joint structure.

8. The joint structure of claim 7, wherein the overlapping edge portions of the first, second, and third metal layers are staggered with respect to one another, so that no said overlapping edge portion lies directly above any other said overlapping edge portion within the joint structure.

9. The joint structure of claim 8, wherein the plastic material is a matrix of glass fibres embedded in a resin.

10. The joint structure of claim 7, wherein the plastic material is a matrix of glass fibres embedded in a resin.

11. The joint structure of claim 1, wherein the overlapping edge portion of the first metal layer is staggered with respect to the overlapping edge portion of the second metal layer, so that no said overlapping edge portion lies directly above any other said overlapping edge portion within the joint structure.

12. The joint structure of claim 11, wherein the plastic material is a matrix of glass fibres embedded in a resin.

13. The joint structure of claim 2, wherein the overlapping edge portions of the first, second, and third metal layers are staggered with respect to one another, so that no said overlapping edge portion lies directly above any other said overlapping edge portion within the joint structure.

14. The joint structure of claim 13, wherein the plastic material is a matrix of glass fibres embedded in a resin.

15. The joint structure of claim 1, wherein the plastic material is a matrix of glass fibres embedded in a resin.

16. The joint structure of claim 2, wherein the plastic material is a matrix of glass fibres embedded in a resin.

* * * * *